United States Patent [19]

Ross

[11] Patent Number: 4,818,256
[45] Date of Patent: Apr. 4, 1989

[54] STEAM SCRUBBING METHOD AND SYSTEM FOR EXHAUST GASES

[76] Inventor: Jody D. Ross, 809 Liberty, Suite B, Boise, Id. 83704

[21] Appl. No.: 183,899

[22] Filed: Apr. 20, 1988

[51] Int. Cl.$^4$ ............................................. B01D 47/00
[52] U.S. Cl. ........................................ 55/93; 55/263; 422/168; 239/418
[58] Field of Search ................... 55/73, 10, 83, 84, 92, 55/93, 94, 263, 241, 465; 261/17, DIG. 76, DIG. 9, 79.2, 118; 422/168; 423/242, 244, 172, 225, 232; 239/518, 521, 418

[56] References Cited

U.S. PATENT DOCUMENTS

| | | | |
|---|---|---|---|
| 1,641,995 | 9/1927 | Schobrone | 261/DIG. 9 |
| 2,812,929 | 11/1957 | Rushford | 261/17 |
| 3,239,999 | 3/1966 | Price | 55/223 |
| 3,456,622 | 7/1969 | Thornton et al. | 122/179 |
| 3,713,277 | 1/1973 | Sackett, Sr. | 55/223 |
| 3,744,221 | 7/1973 | Ross | 55/1 |
| 3,778,981 | 12/1973 | Ross | 55/263 |
| 3,779,709 | 12/1973 | Yamada | 23/260 |
| 3,904,376 | 9/1975 | Kawata | 23/284 |
| 3,910,766 | 10/1975 | Yamada | 23/260 |
| 3,920,423 | 11/1975 | Ross | 55/103 |
| 4,308,241 | 12/1981 | de Vries | 423/242 R |
| 4,345,916 | 8/1982 | Richards et al. | 55/833 |
| 4,437,866 | 3/1984 | Pweblo | 55/85 |

FOREIGN PATENT DOCUMENTS 596448  8/1925  France ..................... 239/518

*Primary Examiner*—Bernard Nozick
*Attorney, Agent, or Firm*—Mallinckrodt & Mallinckrodt

[57] ABSTRACT

A steam scrubber system passes an exhaust gas to be cleaned into a steam chamber having an inflow of steam directed toward an impingement plate against which a jet of a liquid carrying a treatment chemical is directed for atomization and mixing with the steam. The treatment chemical is one, such as lime, slaked or unslaked, which would be ineffective if mixed directly with the steam. The resulting mixture is passed into a cooling and demisting chamber before release to the atmosphere. The system may employ double steam chambers justaposed about a cooling and demisting chamber in common, from where the cleaned gas is passed into the atmosphere or otherwise.

6 Claims, 2 Drawing Sheets

STEAM SCRUBBING METHOD AND SYSTEM FOR EXHAUST GASES

BACKGROUND OF THE INVENTION

1. Field

The invention has to do with the removal of gaseous and particulate pollutants from various exhaust gases by the use of chemically-charged steam.

2. State of the Art

The scrubbing of exhaust gases with steam to remove gaseous and particulate pollutants is disclosed in each of U.S. Pat. Nos. 3,744,221 of July 10, 1973; 3,778,981 of Dec. 18, 1973; and 3,920,423 of Nov. 18, 1975 to Samuel Scott Ross, as well as in U.S. Pat. No. 3,904,376 of Sept. 9, 1975 to Tadao Kawata. None of these chemically charge the steam, but the use of chemicals such as lime (calcium carbonate) in conjunction with the water scrubbing of exhaust gases is disclosed by U.S. Pat. Nos. 3,456,622 of July 22, 1969 and 3,779,709 of Dec. 18, 1973, and a de-misting stage for exhaust gases scrubbed by a water spray is disclosed by U.S. Pat. No. 3,713,277 of Jan. 30, 1973.

SUMMARY OF THE INVENTION

In accordance with the present invention, a liquid solution or suspension of a treatment chemical for an industrial exhaust gas, which chemical cannot be mixed effectively directly with steam, for example water carrying lime as calcium carbonate or calcium hydroxide, is introduced under pressure into steam as a carrier and is atomized for mixing with the exhaust gas. This is advantageously accomplished by directing an incoming jet of the chemical liquid against an impingement plate in the scrubber chamber toward which a flow of incoming steam is also directed, the jet of chemical liquid preferably crossing the flow of steam prior to impingement of either against the impingement plate, which plate is preferably placed so as to direct the resulting highly atomized liquid angularly into the exhaust gas within a steam scrubber chamber. The steam vapor becomes charged with the chemical and effects particle conglomeration within the chamber. Such steam vapor naturally carries a negative electrical charge, some of which is picked up by the atomized chemical liquid and helps sub-micron sized particles of the atomized chemical liquid to conglomerate with the pollutant particles to be removed from the exhaust gas to be cleaned, which are normally positively charged. The particle conglomerates drop to the bottom of the chamber and are washed away by outflowing liquid.

The system of the invention includes cooling of the steam-scrubbed and chemically-treated exhaust gas before release to the atomsphere by passing such exhaust gas through a chamber into which cold water is sprayed. This coincidentally removes any residual steam mist from such exhaust gas.

The system may comprise a single steam scrubber chamber coupled to a cooling chamber and a stack for discharge of the clean gas into the atmosphere, or it may comprise multiple steam scrubber chambers arranged to treat fractional parts, respectively, of the stream of inflowing exhaust gas to be cleaned, as for example by clustering such steam scrubber chambers about a central cooling chamber in common leading into a stack in common. The cooling chamber may be provided at its bottom with a pool of water which is recirculated through cooling means and through sprays within such chambers by pumping from the pool.

THE DRAWINGS

Embodiments of steam scrubber apparatus constituting the best mode presently contemplated for carrying out the invention in actual practice are illustrated in the accompanying drawings in which:

FIG. 1 is a view in elevation of a single steam chamber scrubber system, portions of walls of the steam chamber and the cooling chamber being broken out to reveal internal structure;

FIG. 2, an elevation partly in vertical section of a lower portion of the internal structure of the steam scrubber chamber looking from the line 2—2 in FIG. 1 and drawn to a considerably larger scale;

FIG. 3, a horizontal sectional view taken on the line 3—3 of FIG. 2 and drawn to a considerably larger scale, with flow being indicated by broken lines and appended arrows;

FIG. 4, a top plan view, largely schematic and partly in horizontal section taken along lower and upper planes to show lower and upper ports, respectively, of a multiple scrubber system wherein the flow of incoming exhaust gas is divided in half and sent, respectively, to sections which each comprises double steam scrubbing chambers; and FIG. 5, a vertical section taken on line 5—5 of FIG. 4 to show the system of FIG. 4 in side elevation, upper portions and fragmentary parts of lower portions of the steam scrubbers in the foreground being broken away to show the steam scrubbers in the background and the cooling and demisting chamber in axial vertical section.

DETAILED DESCRIPTION OF ILLUSTRATED EMBODIMENTS

Figure 1:
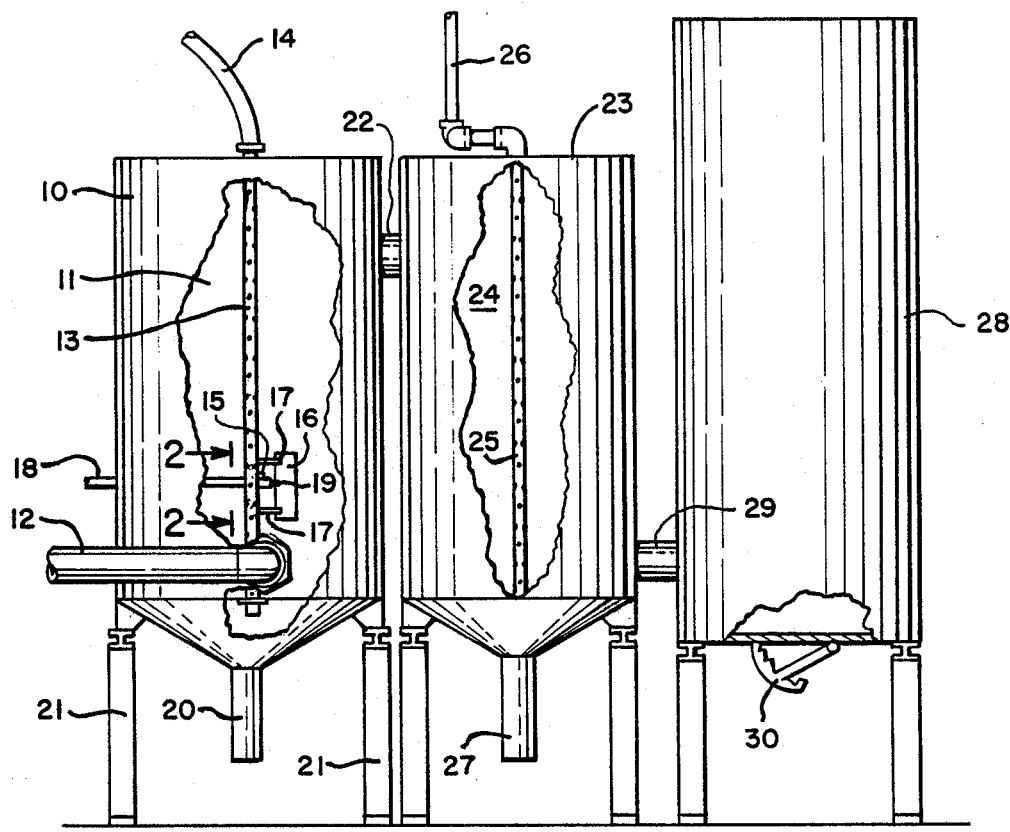
Figure 2:
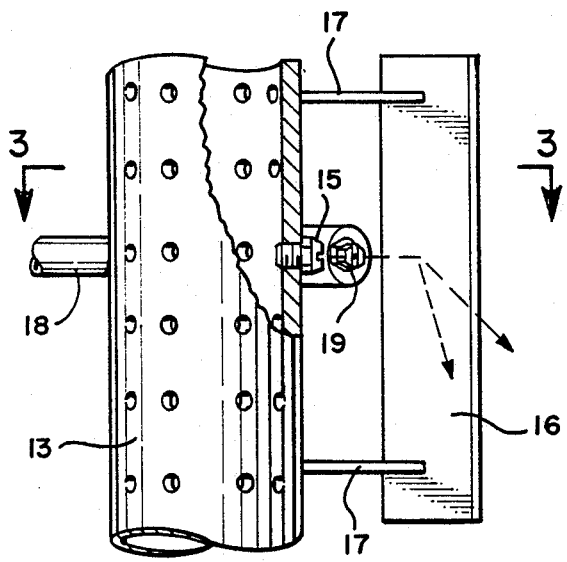
Figure 3:
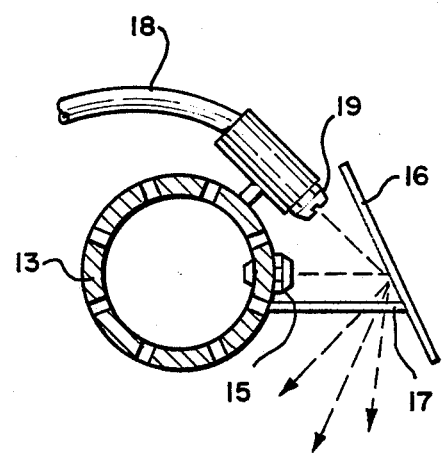

In the single scrubber chamber system of FIGS. 1-3, a steam scrubber 10 provides a scrubber chamber 11 into which exhaust gas to be treated is carried by an inflow conduit 12. Wet steam is introduced into chamber 11 along its height through the closed top of the rubber and along the height of the scrubber chamber through a perforate pipe 13 from a steam supply conduit 14, as is the case in the apparatus of my aforenoted issued patents. Here, however, a jet nozzle 15 at the lower end portion of pipe 13 is directed laterally of such pipe toward an impingement plate 16 that is supported by brackets 17.

For mixing with the steam within scrubber chamber 11, a jet of a liquid containing a gas treatment chemical, such as water containing five percent lime (calcium carbonate) or slaked lime (calcium hydroxide), which chemicals would be difficult or impossible to mix directly with steam, i.e. the chemical would be prematurely precipitated, is discharged from a supply conduit 18 through nozzle 19 and projected against impingement plate 16 at or adjacent to impingement of the steam thereon. The treatment liquid is atomized by striking the impingement plate and is intimately mixed with steam thereat and elsewhere within scrubber chamber 11. The impingement plate is preferably positioned at an angle to the incoming streams of chemical carrying liquid and steam, as shown, the latter being arranged so that the stream of chemical solution crosses streams of steam before impingement as indicated by the broken lines in FIG. 3. The droplets of steam tend to act as a carrier for the chemical and maintain the negative electrical charge that is natural to the stream. Thus, the chemical-carrying steam particles attract positively charged particles within the scrubber chamber, resulting in particle agglomeration and causing descent of such agglomerated particles in the scrubber chamber.

Steam condensate and solids, made up both of particulate matter carried into scrubber chamber 11 by the gas to be treated and agglomerated solid particles produced by reaction of the treatment chemical and atmospheric pollutants, such as sulfur dioxide and nitrogen oxide in the gas, flow out the bottom discharge pipe 20 of scrubber 10. For this purpose, scrubber 10 is preferably mounted above ground level on supports 21.

The gaseous effluent rising in scrubber chamber 11 flows through an outlet pipe 22 into the upper part of a vessel 23 that defines a cooling chamber 24 into which cooling water or other suitable liquid is sprayed by a spray pipe 25 from supply piping 26. As here shown, spray pipe 25 preferably extends axially within cooling chamber 24 throughout its height. The cooling spray and condensed steam settle as a mass of liquid at the bottom of vessel 23 and flow out through pipe 27. Thus, cooling chamber 24 serves also as a demisting chamber for mist carried over by the gas flowing from the steam scrubbers.

Effluent gas passes from chamber 24 into stack 28 by way of a pipe 29 and thence, as in the apparatus of my hereinbefore noted patents, into the atmosphere through the open top of stack 28, which stack is advantageously provided with an adjustable damper 30 (shown schematically) in its otherwise closed bottom.

Figure 4:
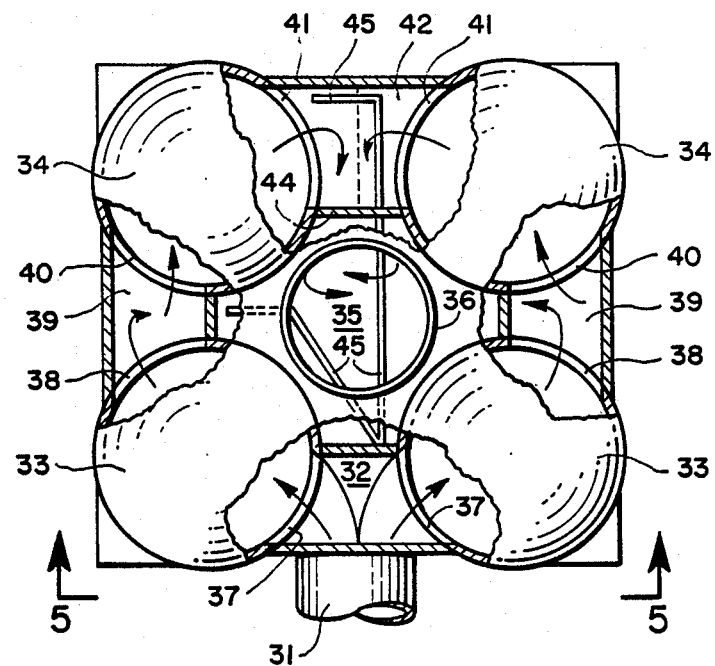
Figure 5:
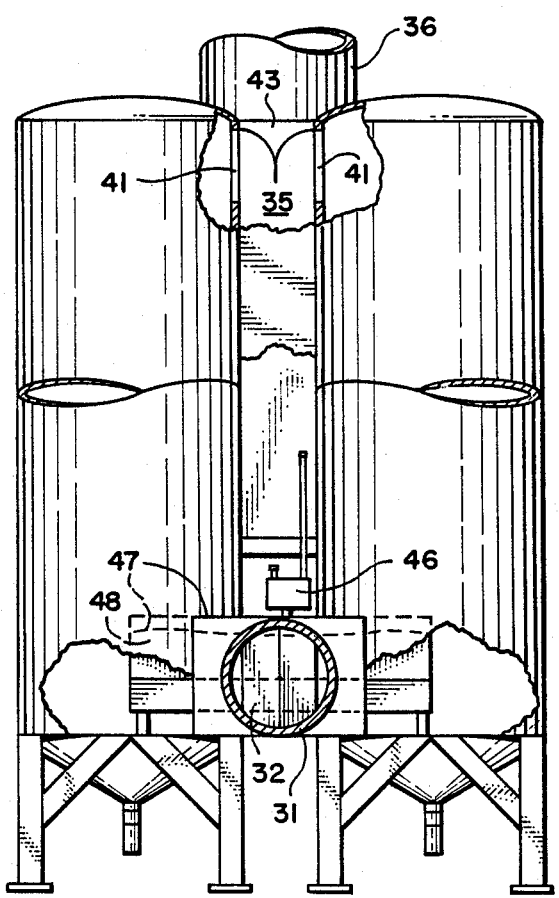

In the multiple steam scrubber chamber system of FIGS. 4 and 5, an incoming stream of exhaust gas to be treated as in the foregoing single steam scrubber chamber embodiment is introduced into the system through conduit 31, being split evenly by divider 32 to flow into opposite and mutually identical steam scrubber chamber sections, each as here shown comprising a set of serially arranged, double steam scrubbers 33 and 34, from where the mixed chemically treated gas and residual steam flow into a central cooling and demisting chamber 35 in common and from which the clean gas flows to the atmosphere through a stack 36 in common.

Each steam scrubber 33 and 34 corresponds to steam scrubber 10 of the prior embodiment. Flow of exhust gas into the first steam scrubber 33 of each set from conduit 31 is by way of ports 37, respectively, located in the lower portion of the respective scrubbers, the flow being divided by divider 32. Outflow of the treated gas and steam mixture from the first scrubbers of the respectives sets is by way of upper ports 38, respectively, into respective downflow passages 39 that are interosed between the first and second scrubbers of the sets, and from there into the lower portions of second scrubbers 34 of the respective sets by way of lower ports 40, respectively. Outflow of the twice-treated gas and steam mixture from the second scrubbers of the respective sets is by way of upper ports 41, respectively, directed laterally into a single downflow passage 42 in common, downflow being aided by the presence of a deflector 43 at the entries of ports 41 into such downflow passage 42. Outflow from passage 42 of the downflowing clean gas and steam mixtures from the respective sets into cooling and demisting chamber 35 is by way of a lower port 44 in the lower portion of downflow passage 42.

Cooling and demisting chamber 35 is provided with spray bars 45 connected in flow communication with a high pressure pump 46 whose input is in the lower portion of a tank 47 at the bottom of cooling and demisting chamber 35, which catches the descending drops of spray and condensed steam and provides a pool 48 of the coolant liquid, usually water. Enroute to spray bars 45, the pumped coolant is passed through suitable cooling means (not shown).

Downflow passage 42 is advantageously made into an auxiliary cooling and demisting chamber by the provision therein of additional spray bars 45.

Outflow from the bottoms of the multiple steam scrubbers is advantagously passed into troughs (not shown) for disposal, while the clean and demisted gas is discharged to the atmosphere through stack 36 or may be passed to any desired location through suitable piping connected to such stack or to the upper part of chamber 35. The floor of recirculation tank 47 may be cleaned of precipitated matter from time to time.

Whereas this invention is here illustrated and described with specific reference to the embodiments thereof presently contemplated as the best modes of carrying out such invention in actual practice, it is to be understood that various changes may be made in adapting the invention to different embodiments without departing from the broader inventive concepts disclosed herein and comprehended by the claims that follow.

I claim:

1. A method of cleaning an exhaust gas, comprising the steps of flowing an exhaust gas into a steam scrubber having a steam scrubber chamber within which is impingement plate means; directing a flow of steam toward said impingement plate means; and directing a jet of a liquid carrying a gas treatment chemical toward and against said impingement plate means, so as to atomize said liquid and mix it with the steam.

2. A method of cleaning an exhaust gas in accordance with claim 1, wherein the jet of chemical carrying liquid is directed to intersect the flow ofsteam prior to impingement of either against the impingement plate means.

3. A method of cleaning an exhaust gas in accordance with claim 1, wherein the gas treatment chemical is one that would be difficult or impossible to use effectively with steam if not introduced iwth a liquid carrier.

4. A method of cleaning an exhaust gas in accordance with claim 3, wherein the liquid is water carrying lime, slaked or unslaked.

5. A steam scrubber system for exhaust gases, comprising a steam scrubber having at least one steam scrubber chamber; means for introducing a gas to be cleaned into said chamber; impingement plate means within said chamber; means for introducing steam into said chamber in flow directed toward said impingement plate; means for introducing a jet of a gas treatment chemical carrying liquid into said chamber against said impingement plate means, so as to atomize said liquid and mix it with the steam in said chamber; a cooling and demisting chamber; means for introducing the liquid and steam mixture into said cooling and demisting chamber; means for spraying a cooling liquid into said cooling and demisting chamber; and means for discharging the cleaned gas from said cooling and demisting chamber.

6. A steam scrubber system according to claim 5, wherein the means for introducing a jet of a gas treatment chemical carrying liquid is connected to a source of water carrying lime, slake or unslaked.

* * * * *